March 20, 1973   H. MARTIN   3,721,020
EDUCATIONAL DEVICE
Filed May 26, 1971
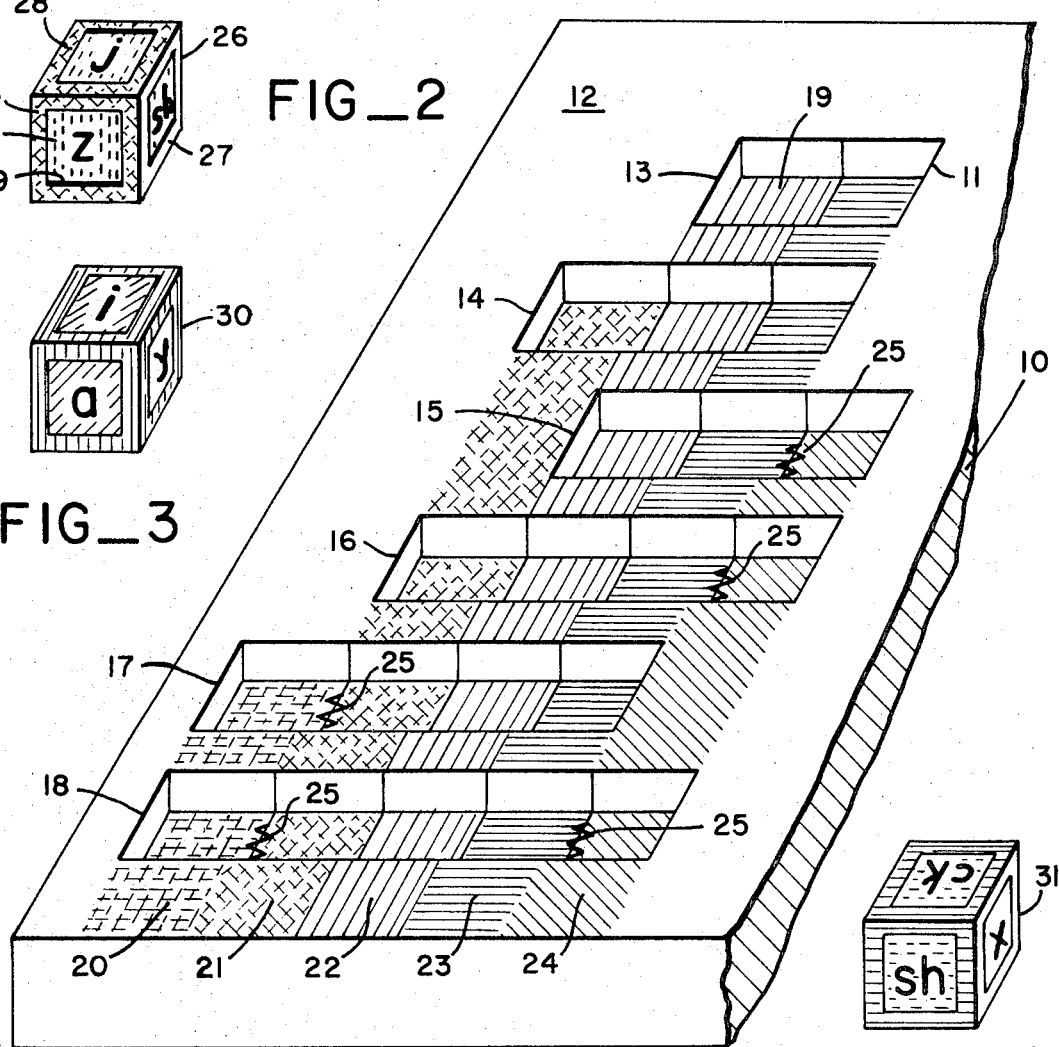
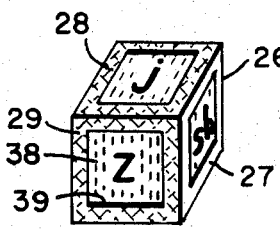
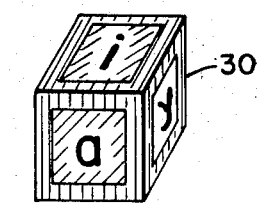
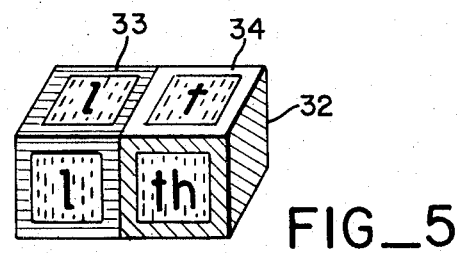
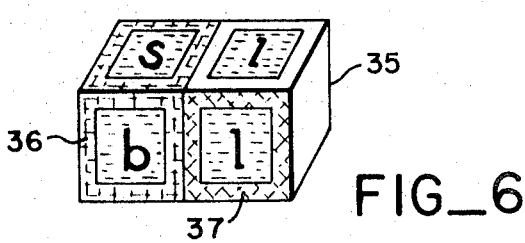
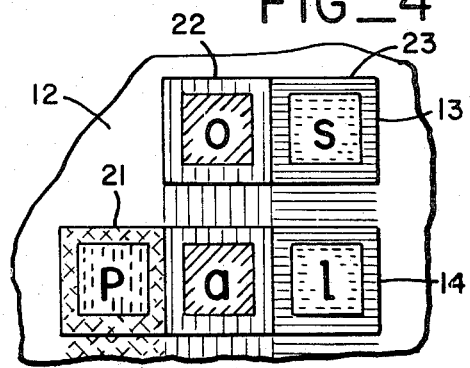
INVENTOR.
HULBERT MARTIN
BY
Mellin, Moore + Weissenberger
ATTORNEYS

United States Patent Office 3,721,020
Patented Mar. 20, 1973

3,721,020
EDUCATIONAL DEVICE
Hulbert Martin, 2928 Hillegass Ave.,
Berkeley, Calif. 94705
Filed May 26, 1971, Ser. No. 146,907
Int. Cl. G09b 1/16
U.S. Cl. 35—35 H                              9 Claims

ABSTRACT OF THE DISCLOSURE

An educational device is disclosed comprising a first, second and third means having different distinguishing indicia thereon. The first means includes at least one consonant thereon that normally occurs immediately before a vowel appearing in a single syllable word. The second means includes at least one vowel thereon. The third means includes at least one consonant thereon that normally occurs immediately after a vowel appearing in a single syllable word. A board or the like is provided having a plurality of linearly disposed rows with delineated areas for accommodating the various means, at least some of the areas being aligned in linearly disposed columns normal to the linearly disposed rows with all of the areas in each normally aligned column being of the same indicium, this latter indicium corresponding to the indicia on each of the means. In this manner, the proper placement of the means on the board will result in the formation of a single syllable word or a part thereof.

BACKGROUND OF THE INVENTION

Field of the invention

The invention relates to an educational device; and, more particularly a combination game and educational device comprising lettered blocks for teaching children to read phonetically while playing a game or the like.

DESCRIPTION OF THE PRIOR ART

Reading may be thought of as being composed of two skills, the first phonetic, the second having to do with comprehension. Phonetic skills are the ability to turn symbols into sound, to recognize that the arrangement of symbols such as c-a-t produces the sound "cat." The skills of comprehension have to do with the ability to turn sounds into meaning—that is, to know that the utterance "cat" refers to a certain furry, four-legged animal. Many comprehension skills are learned informally, by reading, or by interaction with people who speak the language fluently. Phonetic skills, on the other hand, are based upon a few relatively simple rules and may be "taught" in a more formal manner.

There are two aspects to phonetic skills—(1) learning letter sounds, and (2) putting letter sounds together to form words. With regard to the first, there are a variety of methods in use for teaching letter sounds, many of them fairly satisfactory. However, with regard to the second, no satisfactory comprehensive system has been hitherto developed for teaching the child to form word sounds from letter sounds. In fact, what is called "phonetic" teaching of reading often means only the teaching of letter sounds.

There exists a need for an educational tool to remedy this deficiency. Such a device should be relatively simple, easily understood and operated by young children, and should allow the child to produce and to practice virtually any pronounceable, single syllable letter combination that occurs in the English language, and no unpronounceable combinations. Thus, it should give the child the phonetic skills necessary to decode—to read—virtually any word he will have occasion to encounter. Such a device should further enable a child learing to read to progress in the simplest and most efficient fashion from the easiest combinations of letters to those which are progressively more difficult.

SUMMARY OF THE INVENTION

It is an object of this invention to provide a device for teaching children to read phonetically.

It is a further object of this invention to provide such a device in the form of a game or the like which is comparatively simple, attractive and interesting.

It is a still further object of this invention to provide such a device which enables even young children to learn to read and to spell through which means they may grasp the linguistic concepts involved with ease.

It is an even further object of this invention to provide such an educational device which enables the user to progress from the easiest combination of letters to progressively more difficult combinations.

These and other objects are preferably accomplished by providing a first, second and third means having different distinguishing indicia thereon. The first means includes at least one consonant thereon that normally occurs immediately before a vowel appearing in a single syllable word. The second means includes at least one vowel thereon. The third means includes at least one consonant thereon that normally occurs immediately after a vowel appearing in a single syllable word. A board or the like is provided having a plurality of linearly disposed rows with delineated areas for accommodating the various means, at least some of the areas being aligned in linearly disposed columns normal to the linearly disposed rows with all of the areas in each normally aligned column being of the same indicium, this latter indicium corresponding to the indicia on each of the various means. In this manner, the proper placement of the means on the board will result in the formation of a single syllable word or a part thereof.

BRIEF DESCRIPTION OF THE DRAWINGS

FIG. 1 is an isometric view of a board to be used in accordance with my invention;

FIGS. 2 through 4 are isometric views of single blocks to be used to carry out my invention;

FIGS. 5 and 6 are isometric views of doubled blocks to be used to carry out my invention; and FIG. 7 is a top plan view of a portion of the board of FIG. 1 showing some of the blocks in position thereon.

DESCRIPTION OF THE PREFERRED EMBODIMENT

Referring now to FIG. 1 of the drawings, a board 10 is shown which may take any convenient configuration. As shown, it preferably is of a sufficient thickness so that the cavities may be formed therein for receiving a plurality of blocks in these cavities.

Preferably, the board 10 includes a generally triangular zone 11. The area 12 surrounding zone 11 may be of a contrasting color for reasons to be discussed further hereinbelow. Within zone 11, a plurality of linearly disposed rows such as horizontal rows 13 through 18 are formed. These rows 13 through 18 include a plurality of delineated areas 19 therein. Areas 19 may be merely printed or embossed or the like on board 10; however, for reasons to be discussed further hereinbelow, these areas 19 are formed as cavities or the like in board 10. Finally, areas 19 are vertically aligned with like areas in the adjacent horizontal rows. Thus, a plurality of vertically aligned columns 20 through 24 are also formed.

Although a specific number and arrangement of areas 19 are illustrated in FIG. 1, obviously various arrangements may be provided in accordance with the teachings of my invention. However, each vertical column 20 through 24 is of one color or other identifying indicia as compared to the remaining vertical columns. For example, all of the areas 19 in columns 20 through 24 are yellow, orange, red, blue and green, respectively.

Areas 19 in each horizontal row form word patterns and preferably are arranged in a roughly triangular form, with the shortest word patterns preferably appearing at the apex of triangular zone 11 and the longest word patterns appearing at the base. These word patterns thus consist of contiguous horizontal colored squares or areas 19 (which may be cavities in board 10). Zigzag lines 25 indicate doubled squares for reasons to be discussed further hereinbelow.

The blocks to be used in conjunction with board 10 are illustrated in FIGS. 2 through 5. Any desired number of blocks may be used since they are interchangeable on board 10. For example, as shown in FIG. 2, a cubical block 26 is provided having exposed faces 27 through 29. All of the faces may have appropriate indicia thereon. Thus, block 26 is one of a first set of blocks which are of like coloring and are of the same coloring, e.g., orange, as vertical column 21. Blocks 26 are pre-vowel consonant blocks, that is, they represent consonants that normally occur immediately before the vowel appearing in a single syllable word and have one or more such consonants on each face thereof as shown. Block 30 is one of a second set of blocks which are of like coloring and are of the same coloring, e.g., red, as vertical column 22 of board 10. These blocks are vowel blocks and have one or more vowels on each face (the letter "y" being used in this instance as a vowel). Block 31 is one of a third set of blocks which are of like coloring and are of the same coloring, e.g., blue, as vertical column 23 of board 10. These blocks are post-vowel consonant blocks and have one or more consonants that normally occur immediately after the vowel in a single syllable word on each face thereof as shown. The letter or letters on each face of blocks 26, 30 and 31 represent one letter-sound (to clarify—the two letters "ph" for instance, may appear on a single face of block 26 but these two letters still represent only the one sound /f/ (i.e., the phonetic sound of the letter "f").

A plurality of doubled blocks (FIG. 5) are also provided. These blocks are not all of the same color. (For convenience of illustration only, not all faces of the blocks of FIGS. 4–6 are colored.) For example, block 32 comprises a first blue block 33 joined at one face to a second green block 34. Thus, doubled block 32 conforms to the vertical rows 23 and 24 of board 10 where zigzag lines 25 indicate such blocks are to be located. Blue-green blocks 32 thus represent two consonants as shown that occur immediately after the vowel in a single syllable word, and have two or more such letters on each long side, at least one on each of the two individual blocks 33 and 34. The ends of such doubled blocks 32 are blank.

As shown in FIG. 6, a second set of doubled blocks 35 may also be provided. Doubled blocks 35 include a pair of individual blocks 36 and 37 joined at one face thereof. Block 36 may be yellow while block 37 may be orange, thus corresponding to vertical rows 20, 21 of board 10 as indicated by zigzag lines 25. Blocks 35 represent two consonants as shown that normally occur immediately before the vowel in a single syllable word and thus have two or more such letters on each long side, at least one on each of the two individual blocks. The ends of blocks 35 are also blank.

The letter or letters on the faces of each individual block on the long side of one of the doubled blocks 32 and 35 represent one letter-sound. Thus, each long side of a doubled block—whether it has two or more than two letters on it—represents two letter-sounds.

Although no particular number of the blocks of FIGS. 2 through 6 have been disclosed, enough blocks of each color should be provided so that virtually every letter that occurs in a particular position in words of the English language will be represented on the blocks of that position. When there is more than one block of a particular color or color combination, letters that are graphically similar (for example, the letters "b" and "d") and letters that are similar or identical in pronunciation (e.g., the letters "f" and "v" are similar; the combination of letters "oi" and "oy" are identical) are preferably placed on the same block. Such placement allows the child, while practicing, to maximize his awareness of patterns, identities and similarities, and to maximize his ability to make subtle discriminations.

The letters shown on the blocks of FIGS. 2 through 6 may be placed thereon as by labels or the like (e.g., label 38 in FIG. 2). The background of all such labels on one particular block, whether the block be single or doubled, is preferably the same color (e.g., the color "violet" on FIG. 2). On like colored blocks having different letters on their faces (e.g., a plurality of the blocks 26 of FIG. 2 with different letters on all the faces), the label backgrounds are different colors (e.g., "violet" as shown in FIG. 2 on one block; "pink"—not shown—on a second block of FIG. 2, etc.). The colors "brown" and "gray" are shown on the blocks of FIGS. 3 and 4, respectively, and "violet" and "gray" on the blocks of FIGS. 5 and 6. These colors preferably are pale or lighter than normal to bring out more clearly the letter or the letters on the label. Such color coding may be used to facilitate easy sorting of all of the blocks and easy retrieval of any particular desired blocks within one set of blocks.

Finally, an identifying line or the like, such as a dark line 39—FIG. 2—may be placed beneath the letters on the face of a block to indicate how that face is to be oriented. Line 39 has been omitted in the remaining figures of the drawings for convenience of illustration.

The use of the blocks of FIGS. 2 through 6 in conjunction with board 10 will now be described. Since all of the red blocks 30 of FIG. 3 represent vowels, all the orange blocks 26 of FIG. 2 and yellow-orange blocks 35 of FIG. 6 represent pre-vowel consonants and all of the blue blocks 31 of FIG. 4 and the blue-green blocks 32 of FIG. 5 represent post-vowel consonants, the color of a particular block specifies its position with respect to blocks of another color. This is shown in part in FIG. 7 wherein a portion of board 10 is shown with the appropriate colored blocks in place as indicated, thus forming pronounceable words or parts of words, as "os" and "pal." Only one block of a particular color can occur in a given word. This means that not only can two orange blocks 26 not occur in a word, but that an orange block 26 and a yellow-orange doubled block 25 may not both occur in a particular word. Secondly, given the restrictions mentioned above, the blocks can occur in a word only in the following color sequence—yellow, orange, red, blue, green. This does not mean that a word pattern must contain blocks of all five colors, but only that *if* a particular color does occur, it *must* occur in its designated position in the color order. The only color of a block that must occur in a word is red, since every word contains a vowel. The only exception to the color order is silent "e," which is often transposed to the end of the syllable. (Red silent "e" is also the only exception to the rule that a block of a certain color may occur only once in a syllable.) As one further rule of arrangement, since the yellow and green blocks occur only in combination with orange and blue, respectively, there may be no pattern containing a yellow without an orange or a green without a blue.

These restrictions—no more than one block of each color, a color order, the necessary occurrence of red, the possible occurrence of terminal "e"—limit the number of patterns of letter combinations that may be made. In all, following the stated rules, there are 22 possible patterns—red-blue, orange-red-blue, red-blue-green—and so forth. These patterns may be divided into three distinct word types: (a) those containing single short vowels (for instance, /a/ as in "apple"), (b) those containing single long vowels (for instance, /æ/ as in "ape"), and (c) those in which two vowel letters, excluding terminal "e," represent one vowel sound ("a-w" as in "saw"). Words from group (a) are generally considered easiest and are placed first in a phonetic reading sequence; groups (b) and (c) are generally considered next easiest and hardest, respectively, and are placed in the reading sequence accordingly. On the board 10, groups (a), (b) and (c) may be represented by three areas 12 of color—areas corresponding to (b) and (c) not shown—such areas being placed from left to right in a board sequence according to the aforementioned scale of difficulty. The three areas of color should contrast—to the colors of vertical rows 20 through 24; to the colors of blocks 26, 30, 31, 32 and 35; and to the colors of labels 38—so that the various indicia shall remain distinct and visually obvious.

Group (a) is thus area 12 of FIG. 1 and contains six patterns; group (b) (not shown) may contain seven patterns; and group (c) (also not shown) may contain nine patterns. Words that are shorter are generally considered easier than those which are longer, and this principle may be used to sequence the patterns within each group. Thus, red-blue will occur before orange-red-blue, and so forth. Generally, single consonants are considered easier to read than double consonants, and may be placed earlier in the sequence. Thus, even though the patterns orange-red-blue and red-blue-green in group (a) (i.e., area 12 of FIG. 1) are of the same length, orange-red-blue will be placed earlier in the sequence.

To sum up, the patterns in group (a) will be in the following sequence of increasing difficulty: red-blue, orange-red-blue, red-blue-green, orange-red-blue-green, yellow-orange-red-blue, yellow-orange-red-blue-green. The patterns of group (b) may be in the following order of increasing difficulty: red, orange-red, orange-red-red "e," orange-red-blue-red "e," yellow-orange-red, yellow-orange-red-red "e," yellow-orange-red-blue-red "e." The patterns of group (c) may be in the following order of increasing difficulty: red, red-blue, orange-red, orange-red-blue, yellow-orange-red, yellow-orange-red-blue, red-blue-green, orange-red-blue-green, yellow-orange-red-blue-green.

Although only group (a) is illustrated in FIG. 1, obviously groups (b) and (c) have the same physical layout of triangular zone 11, as illustrated in FIG. 1, the areas relating to groups (b) and (c) being omitted for convenience of illustration. The rows in these areas corresponding to groups (b) and (c) may, of course, be of different lengths than the rows in zone 11.

The board 10 of my invention and the blocks of FIGS. 2 through 6 may be used to play a game and thus be more stimulating and interesting to the child. For example, after learning the letter-sounds—which may be accomplished by any well-known means—the child begins with the first word pattern. He selects blocks to match the colors of that pattern, and specifies constants. The child then places blocks which are constants on the pattern board 10 with the constants selected face up. The child then shakes like dice those blocks which are not constant, rolls them, and matches them by color to the word pattern. The child then writes on a sheet of paper the word which appears. (By "word" is meant any pronounceable syllable, whether a real word, part of a real word, or a nonsense word.) The child then reads the word to an adult or other person who reads fluently. This may then be checked for accuracy. The child then attempts to complete correctly as many words as possible in a specified period of time.

Play may be varied within a particular word-pattern by changing constants or by changing blocks. Play may continue on that word pattern until the child has mastered the pattern. The child then proceeds to the next word pattern. Completion of word patterns—since it covers nearly all phonetic skills needed in learning to read—may take days, months, or even years. Periodic repetition of previously learned word patterns may be necessary. Of course, as the child develops phonetic skills through use of the blocks, he will apply those skills to the reading of primers, story books and the like.

The device of my invention may also be used to teach spelling. For a given pattern, blocks are selected and constants are stated. The adult selects and pronounces a word that may be spelled using that pattern and those blocks and constants. The child turns the blocks until they spell the desired word and copies the word onto a sheet of paper. The child then spells and reads to the adult the word he has spelled.

Although a specific arrangement of blocks and a board layout have been described hereinabove, obviously many variations may be made to carry out the concepts of my invention. Further, although one particular game has been described, various types of games may be played with my device. The term "blocks" is used broadly and may refer to cards, tabs, etc. The colors may vary from those described above or other indicia may be used. Such blocks need not be cubical but may have more or less than six faces with the various indicia thereon set forth in any convenient manner. In addition, the blocks of FIGS. 2 through 6 may be eliminated and any convenient means used to produce random selection within the various patterns, such as colored letter plaques, letters on rollers, a slot machine arrangement, phonic wheels or the like, computers, teaching machines, etc.

Any convenient type of board may also be used. Such board may be flat with the various areas printed thereon. Several boards or cards may be used, each including some or all of the patterns; or the patterns described may be placed on various pages of a workbook; or a board having the basic color-order pattern may be used which board may be supplemented by a set of cover-cards having one or more linearly aligned apertures therein, each cover-card having these apertures revealing a different portion of the basic color-order pattern when each card is placed on the board. Any other variation may be used so long as the basic concepts of my invention are accomplished in the manner set forth hereinabove. Further, although the teaching of the English language has been described, obviously my device may be used to teach any convenient foreign language. Finally, although my device shows the teaching of pronounceable single syllable words, such term is used loosely and includes a complete word, a part of a word, or a nonsense syllable.

I claim as my invention:

1. An educational device comprising:
   a first means having a first distinguishing indicium thereon and having at least one consonant that normally occurs immediately before a vowel appearing in a single syllable word on at least one face thereof;
   a second means having a second distinguishing indicium thereon different from said first indicium and having at least one vowel on at least one face thereof;
   a third means having a third distinguishing indicium thereon different from said first and second indicia and having at least one consonant that normally occurs immediately after a vowel appearing in a single syllable word on at least one face thereof; and
   a fourth means having a plurality of linearly disposed rows thereon, each of said linearly disposed rows having a plurality of delineated areas therein adapted to accommodate each of said first, second and third means, at least some of said delineated areas being aligned in linearly disposed columns normal to said linearly disposed rows with like areas in adjacent linearly disposed rows, all of the areas in each column aligned normal to said linearly disposed rows being of the same indicium with said latter indicium corresponding to the indicia on each of said first, second and third means.

2. The device of claim 1 wherein there are at least three such linearly disposed columns with the indicia in the first of said columns corresponding to the indicium on the first means, the indicia on the second of said columns adjacent to the first of said linearly disposed columns corresponding to the indicium on the second means and the indicia on the third of said linearly disposed columns adjacent to the second of said linearly disposed columns corresponding to the indicium on the third means, whereby when said first, second and third means are placed in the areas of each of said columns within one of said linearly disposed rows, a part of a word comprised of at least a consonant that normally occurs immediately before a vowel appearing in a single syllable word followed by a vowel then followed by a consonant that normally occurs immediately after a vowel appearing in a single syllable word is formed in said fourth means.

3. The device of claim 1 wherein all of said first, second and third means are cubical blocks and have said consonant that normally occurs immediately before a vowel appearing in a single syllable word, said vowel and said consonant that normally occurs immediately after a vowel appearing in a single syllable word on at least more than one face of said blocks, at least some of said plurality of consonants that normally occur immediately before a vowel appearing in a single syllable word differing from other of said consonants that normally occur immediately before a vowel appearing in a single syllable word on the faces of the respective blocks, at least some of said vowels differing from other of said vowels on the faces of its respective blocks and at least some of said consonants that normally occur immediately after a vowel appearing in a single syllable word differing from other of said consonants that normally occur immediately after a vowel appearing in a single syllable word on the faces of their respective blocks.

4. The device of claim 1 wherein at least some of said consonants that normally occur immediately before a vowel appearing in a single syllable word, said vowels and said consonants that normally occur immediately after a vowel appearing in a single syllable word are double consonants that normally occur immediately before a vowel appearing in a single syllable word, doubled vowels and doubled consonants that normally occur immediately after a vowel appearing in a single syllable word, respectively.

5. The device of claim 1 wherein said rows on said fourth means vary in length from linearly disposed row to row so that the columns normal to said linearly disposed rows also vary in overall length.

6. The device of claim 3 wherein each of said consonants that normally occur immediately before a vowel appearing in a single syllable word, said vowels and said consonants that normally occur immediately after a vowel appearing in a single syllable word further include contrasting indicia associated therewith, said contrasting indicia differing between said blocks in each of said first, second and third plurality of blocks and differing from said distinguishing indicia on each of said first, second and third plurality of blocks.

7. The device of claim 1 wherein at least some of said first, second and third means comprise a pair of cubical blocks forming doubled blocks whereby at least one of each of said consonants that normally occur immediately before a vowel appearing in a single syllable word, at least one of said vowels and at least one of said consonants that normally occur immediately after a vowel appearing in a single syllable word appear on each face of each of said pair of blocks forming the doubled faces of each of said doubled blocks.

8. The device of claim 7 wherein at least one face of one of said doubled blocks includes at least two of said consonants that normally occur immediately before a vowel appearing in a single syllable word and at least one face of another of said doubled blocks includes at least two of said consonants that normally occur immediately after a vowel appearing in a single syllable word.

9. The device of claim 1 wherein said fourth means is a board having cavities therein forming said delineated areas for receiving said first, second and third means therein.

References Cited

UNITED STATES PATENTS

| | | | |
|---|---|---|---|
| 2,265,334 | 12/1941 | Armbruster | 35—35 J |
| 3,235,976 | 2/1966 | Elliott et al. | 35—35 J |
| 1,286,631 | 12/1918 | Hillyard | 35—71 |
| 3,248,804 | 5/1966 | Jorgens | 35—70 X |

FOREIGN PATENTS

| | | | |
|---|---|---|---|
| 11,484 | 1906 | Great Britain | 35—71 |

WILLIAM H. GRIEB, Primary Examiner

U.S. Cl. X.R.

35—71